United States Patent
Takeshita et al.

(10) Patent No.: US 11,381,466 B2
(45) Date of Patent: *Jul. 5, 2022

(54) NETWORK DESIGN DEVICE, NETWORK DESIGN METHOD, AND NETWORK DESIGN PROCESSING PROGRAM

(71) Applicant: NIPPON TELEGRAPH AND TELEPHONE CORPORATION, Tokyo (JP)

(72) Inventors: Erina Takeshita, Musashino (JP); Hideo Kawata, Musashino (JP); Shinichi Yoshihara, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/977,985

(22) PCT Filed: Feb. 28, 2019

(86) PCT No.: PCT/JP2019/007804
§ 371 (c)(1),
(2) Date: Sep. 3, 2020

(87) PCT Pub. No.: WO2019/172070
PCT Pub. Date: Sep. 12, 2019

(65) Prior Publication Data
US 2021/0075688 A1    Mar. 11, 2021

(30) Foreign Application Priority Data
Mar. 7, 2018  (JP) .............................. JP2018-041256

(51) Int. Cl.
*H04L 41/14*       (2022.01)
*H04L 41/0826*   (2022.01)
(Continued)

(52) U.S. Cl.
CPC ........ *H04L 41/145* (2013.01); *H04L 41/0826* (2013.01); *H04L 41/12* (2013.01); *H04L 45/121* (2013.01); *H04L 45/24* (2013.01)

(58) Field of Classification Search
CPC ... H04L 41/145; H04L 41/0826; H04L 41/12; H04L 45/121; H04L 45/24
See application file for complete search history.

(56) References Cited

U.S. PATENT DOCUMENTS

2007/0053342 A1*  3/2007  Sierecki .................. H04L 45/10
                                                                    370/351
2012/0213081 A1*  8/2012  Imai ..................... H04L 41/0806
                                                                    370/389
(Continued)

OTHER PUBLICATIONS

Erina Takeshita, Hideo Kawata. "Proposal of network design method to accommodate various paths." B-6-29, IEICE General Conference 2017. Mar. 20, 2017.

*Primary Examiner* — John A Follansbee
*Assistant Examiner* — Fadi Haj Said

(57) ABSTRACT

With a network design apparatus, a network design method, and a network design processing program, a network configuration is designed for a network in which a transfer apparatus is disposed at each of a plurality of communication hubs and the communication hubs are connected via a link by a link portion apparatus in the transfer apparatus. In design of a network configuration, a threshold value of an inter-end delay and the number of redundant paths are calculated for each line on the basis of topology information, line information, and design parameter information. A path candidate set is calculated for each line on the basis of the threshold value of the inter-end delay and the number of redundant paths.

3 Claims, 10 Drawing Sheets

(51) Int. Cl.
*H04L 41/12* (2022.01)
*H04L 45/121* (2022.01)
*H04L 45/24* (2022.01)

(56) References Cited

U.S. PATENT DOCUMENTS

| | | | |
|---|---|---|---|
| 2015/0023666 A1* | 1/2015 | Hashiguchi | H04L 41/145 398/79 |
| 2015/0085698 A1* | 3/2015 | Sella | H04L 41/5035 370/254 |
| 2017/0047999 A1* | 2/2017 | Wei | H04L 41/14 |

* cited by examiner

NETWORK DESIGN DEVICE, NETWORK DESIGN METHOD, AND NETWORK DESIGN PROCESSING PROGRAM

CROSS-REFERENCE TO RELATED APPLICATIONS

This application is a 371 U.S. National Phase of International Application No. PCT/JP2019/007804, filed on Feb. 28, 2019, which claims priority to Japanese Application No. 2018-041256 filed on Mar. 7, 2018. The entire disclosures of the above applications are incorporated herein by reference.

TECHNICAL FIELD

Embodiments of the present invention relate to a network design apparatus, a network design method, and a network design processing program.

BACKGROUND ART

In recent years, with the diversification of network services, the number of services has increased and requirements of a network for the services have diversified. Examples of the requirements for a network include an inter-end delay, band assurance, and conditions regarding redundancy. With the increase in the number of services or the diversification of the requirements, a cost of equipment of the network has increased.

In order to curb the increase in cost, for example, a network design in which a plurality of lines possessed by each network service are efficiently accommodated in a common infrastructure network is performed in NPL 1. Accordingly, economy of the network is further improved. In a method of NPL 1, an infrastructure network accommodating lines having different requirements for an inter-end delay is designed. Here, in the infrastructure network to be designed, a transfer apparatus that processes traffic of a path is disposed, and an interface is installed as a link portion apparatus in a link portion of the transfer apparatus. In NPL 1, a disposition and capacity of transfer apparatuses at which a total cost value of interfaces of all transfer apparatuses on the infrastructure network is minimized is derived in the design of the infrastructure network. Thus, in the design of the infrastructure network, a design of a path accommodating each line and equipment design for designing the disposition or capacity of the transfer apparatus on the infrastructure network are performed simultaneously.

An overall flow in a process performed in NPL 1 is illustrated in FIG. 1. In a design of a network as in NPL 1, each line needs to be accommodated in a path satisfying requirements for an inter-end delay. Thus, in S'1, path candidates satisfying the requirements for the inter-end delay are calculated for each line, and a set of path candidates satisfying the requirements described above is a path candidate set, as illustrated in FIG. 1. The path candidate set is selected from path candidates satisfying the requirements described above, and consists of the number of path candidates equal to or smaller than a designated number of path candidates. Here, the number of path candidates is a design parameter, and is designated by a designer.

Further, in NPL 1, interface combination candidates are calculated, and the calculated combination candidate set is used as an interface combination candidate set in S'2. In this case, combination candidates of interfaces that can be installed in the link portion of the transfer apparatus at each communication hub on the infrastructure network are calculated. The combination candidate set includes the number of combination candidates of interfaces that can be installed in the link portion as many as the designated number of interface combination candidates. Here, the number of combination candidates is a design parameter and is designated by a designer. Further, each of the interface combination candidates is a combination of zero or more interfaces. Further, certain interface combination candidates among the interface combination candidates may include the same type of interfaces.

In NPL 1, a total cost value of all the interfaces on the infrastructure network is used as an objective function, and an optimization problem in which an optimal network configuration for minimizing the objective function is derived is solved in S'3. A mathematical relationship obtained by formulating this optimization problem is shown below.

[Math. 1]

$$\operatorname*{argmin}_{\vec{x},\vec{y}} 2\sum_{e\in E}\sum_{j\in J} y_j^e \cdot \Omega_j^{IF} \quad (1)$$

subject to, $$\sum_{i\in I^v} x_i^v = 1, \forall v \in V \quad (2)$$

$$\sum_{j\in J} y_j^e = 1, \forall e \in E \quad (3)$$

$$y_j^e \cdot \Psi_j^{IF} \geq t^e(\vec{x}, \vec{d}, M) \, \forall e \in E \quad (4)$$

Further, matters indicated by, for example, parameters relevant to the relationship (1) to (4) are as follows.

[Math. 2]
L=(l): SET OF COMMUNICATION HUBS
E=(e): SET OF LINKS BETWEEN COMMUNICATION HUBS
V=(v): SET OF LINES
$\vec{x}=(x_i^v)$: LINE V SELECTS PATH CANDIDATE i
$\vec{y}=(y_j^e)$: LINK E SELECTS INTERFACE (IF) COMBINATION CANDIDATE j
$\Omega_j^{IF}$: COST VALUE OF IF COMBINATION CANDIDATE j
$I^v$: PATH CANDIDATE SET OF LINE v
J: IF COMBINATION CANDIDATE SET
$\Psi_j^{IF}$: CAPACITY OF IF COMBINATION CANDIDATE J
$\vec{d}=(d_v)$: CONTRACTED BAND OF LINE v
M: CONNECTION MATRIX (INDICATED BY |L|x|E|) INDICATING CONNECTION FORM BETWEEN COMMUNICATION HUBS
$t^e(\vec{x}, \vec{d}, M)$: SUM OF CONTRACTED BANDS OF LINK e (CALCULATED ON BASIS OF $\vec{x}, \vec{d}, M$)

In the optimization problem of S'3, one path candidate is selected from the path candidate set for each line. For each line, a condition for selecting the path candidate from the path candidate set is shown in the relationship (2). Here, in the relationship (1) to (4), a variable x is a decision variable of the optimization problem. In each line, the variable x changes in correspondence to which path candidate has been selected from the path candidate set. Further, in the optimization problem, one combination candidate for a combination of interfaces is selected from the interface combination candidate set, for each link portion of the transfer apparatus, that is, for each link connecting each communication hub. For each link portion, a condition for selecting an interface combination candidate from a combination candidate set is shown in the relationship (3). Here, in the relationship (1) to (4), a variable y is a decision variable of the optimization problem. In each link portion, the variable y changes in correspondence to which interface combination candidate has been selected from the combination candidate set.

Further, in the optimization problem of S'3, capacity conditions of the relationship (4) are provided. That is, in each link (each link portion), a total contracted band being equal to or smaller than a total capacity of all interfaces constituting the combination candidates is provided as the capacity conditions. Thus, in the optimization problem, a combination candidate selected from an interface combination candidate set needs to satisfy the capacity conditions described above in each link.

In S'3, a total cost value of all interfaces on an infrastructure network shown in the relationship (1) is used as an objective function, and an optimization problem for minimizing the objective function is solved. By solving the optimization problem, an optimal path candidate is determined from the path candidates satisfying the conditions of the relationship (2) to (4), and an optimal combination candidate is determined from the interface combination candidates satisfying the conditions of the relationship (2) to (4).

In NPL 1, because the process is performed as described above, a network configuration with a smallest total cost value, that is, an optimal network configuration can be derived in an infrastructure network accommodating lines having different requirements for an inter-end delay. That is, for a network configuration including a path accommodating lines, and a disposition and capacity of each of transfer apparatuses and link portion apparatuses, an optimal network configuration can be derived from among a plurality of patterns.

CITATION LIST

Non Patent Literature

NPL 1: Erina Takeshita and Hideo Kawada, "多様なパスを収容するネットワーク設計手法の提案 (Proposed Network Design Scheme Accommodating Various Paths)", Electronics, Information and Communication Engineers General Conference B-6-29, 2017.

SUMMARY OF THE INVENTION

Technical Problem

In NPL 1, a network configuration with the smallest total cost value is derived in an infrastructure network accommodating lines with different requirements for an inter-end delay. On the other hand, in an infrastructure network accommodating a variety of network services, it is required to accommodate lines with different requirements for redundancy.

The present invention has been made in view of the above circumstance, and provides a network design apparatus, a network design method, and a network design processing program capable of designing an optimal network configuration in an infrastructure network with a plurality of types of required degrees of path redundancy in calculation of an optimization problem.

Means for Solving the Problem

To achieve the above object, a first aspect of the invention is a network design apparatus for designing a network configuration for a network in which a transfer apparatus is disposed at each of a plurality of communication hubs and the communication hubs are connected via a link by a link portion apparatus in the transfer apparatus, the network design apparatus comprising: an input reception unit configured to receive an input of topology information on a connection state between the communication hubs, line information regarding a plurality of lines accommodated in the network, apparatus information regarding the transfer apparatus disposed at the communication hub and the link portion apparatus in the transfer apparatus, and design parameter information regarding parameters used in the design; a first processing unit including a calculation unit configured to calculate a threshold value of an inter-end delay and the number of redundant paths for each line on the basis of the topology information, the line information, and the design parameter information and calculate a path candidate set for each line on the basis of the threshold value of the inter-end delay and the number of redundant paths, the calculation unit configuring the path candidate set using path candidates including paths each with an inter-end delay equal to or smaller than the threshold value as many as the number of redundant paths; a second processing unit including a calculation unit configured to calculate a combination candidate set of the link portion apparatuses on the basis of the apparatus information and the design parameter information; a third processing unit including a calculation unit configured to calculate, minimizing a total cost value in the overall network, an optimal path candidate of each line and an optimal combination candidate of the link portion apparatus of each link on the basis of a calculation result of the calculation unit of the first processing unit and a calculation result of the calculation unit of the second processing unit; and a generation unit configured to generate optimal network configuration information reflecting both the optimal path candidate of each line and the optimal combination candidate of the link portion apparatus of each link calculated by the calculation unit of the third processing unit.

A second aspect of the present invention is the network design apparatus according to the first aspect, wherein the input reception unit acquires a required degree of path redundancy for each line, and the calculation unit of the first processing unit calculates the number of redundant paths for each line on the basis of the required degree of path redundancy of each line.

A third aspect of the present invention is the network design apparatus according to the second aspect, wherein the calculation unit of the first processing unit calculates the path candidate set on condition that the path candidate set includes the paths as many as the number of the redundant paths for each path candidate, that the inter-end delay of the path included in the path set is equal to or smaller than the threshold value of the inter-end delay, and that the path candidates are different from each other.

A fourth aspect of the present invention is a network design processing program for causing a processor to function as each unit of the network design apparatus according to any one of the first to third aspects.

A fifth aspect of the present invention is a network design method for designing a network configuration for a network in which a transfer apparatus is disposed at each of a plurality of communication hubs and the communication hubs are connected via links by a link portion apparatus in the transfer apparatus, the network design method comprising: acquiring topology information on a connection state between the communication hubs, line information regarding a plurality of lines accommodated in the network, apparatus information regarding the transfer apparatus disposed at the communication hub and the link portion apparatus in the transfer apparatus, and design parameter information regarding parameters used in the design; calculating a threshold value of an inter-end delay and the number of redundant paths for each line on the basis of the topology information, the line information, and the design parameter information, calculating a path candidate set for each line on the basis of the threshold value of the inter-end delay and the number of redundant paths, and configuring the path candidate set using path candidates including paths each with an inter-end delay equal to or smaller than the threshold value as many as the number of redundant paths; calculating a combination candidate set of the link portion apparatuses on the basis of the apparatus information and the design parameter information; calculating, minimizing a total cost value in the overall network, an optimal path candidate of each line and an optimal combination candidate of the link portion apparatus of each link on the basis of a calculation result for the path candidate set for each line and a calculation result for the combination candidate set of the link portion apparatus; and generating network configuration information reflecting both the calculated optimal path candidate of each line and the calculated optimal combination candidate of the link portion apparatus of each link.

Effects of the Invention

According to the first to fifth aspects of the present invention, the number of redundant paths for each line is calculated and the path candidate set is calculated for each line on the basis of the calculated number of redundant paths in an optimization problem for calculating an optimal network configuration that minimizes the total cost value in the overall network. Thereby, it is possible to provide a network design apparatus, a network design method, and a network design processing program capable of designing an optimal network configuration for an infrastructure network with a plurality of types of required degrees of path redundancy in the calculation of the optimization problem.

Further, in the second aspect and the third aspect of the present invention, the number of redundant paths for each line is calculated on the basis of the acquired required degree of path redundancy of each line. Thus, in the calculation of the optimization problem, it is possible to more appropriately derive an optimal network configuration for an infrastructure network with a plurality of types of required degrees of path redundancy.

Further, in the third aspect of the present invention, the path candidate set including path candidates including different path sets is calculated in the calculation of the path candidate set for each line. Thus, in the calculation of the optimization problem, it is possible to more appropriately derive an optimal network configuration for an infrastructure network with a plurality of types of required degrees of path redundancy.

DESCRIPTION OF EMBODIMENTS

Hereinafter, embodiments of the present invention will be described with reference to the drawings. An L2 switch is used as an example of a network apparatus in each embodiment. As a transfer apparatus, any network apparatus can be used as long as the network apparatus is an apparatus in which a link portion apparatus such as an interface can be installed as equipment within the network apparatus, in addition to the L2 switch. For example, in each embodiment, a router or the like is available as the network apparatus (transfer apparatus).

First Embodiment

In a first embodiment, path candidates satisfying a required degree of path redundancy of each line are calculated. This allows a network configuration capable of accommodating a plurality of lines having different required degree of path redundancy to be derived.

Apparatus

Figure 1:
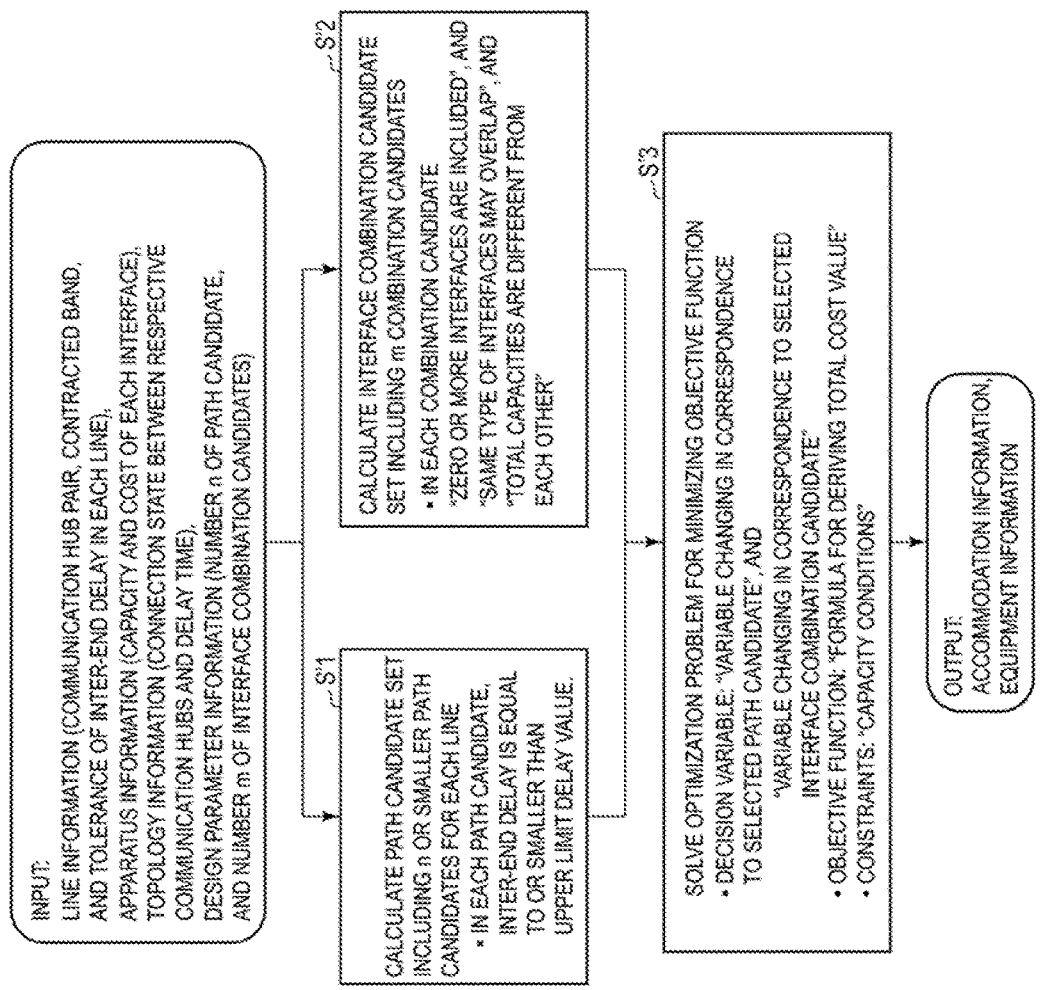
FIG. 1 is a flowchart illustrating an overall flow in a process performed in NPL 1.
Figure 2:
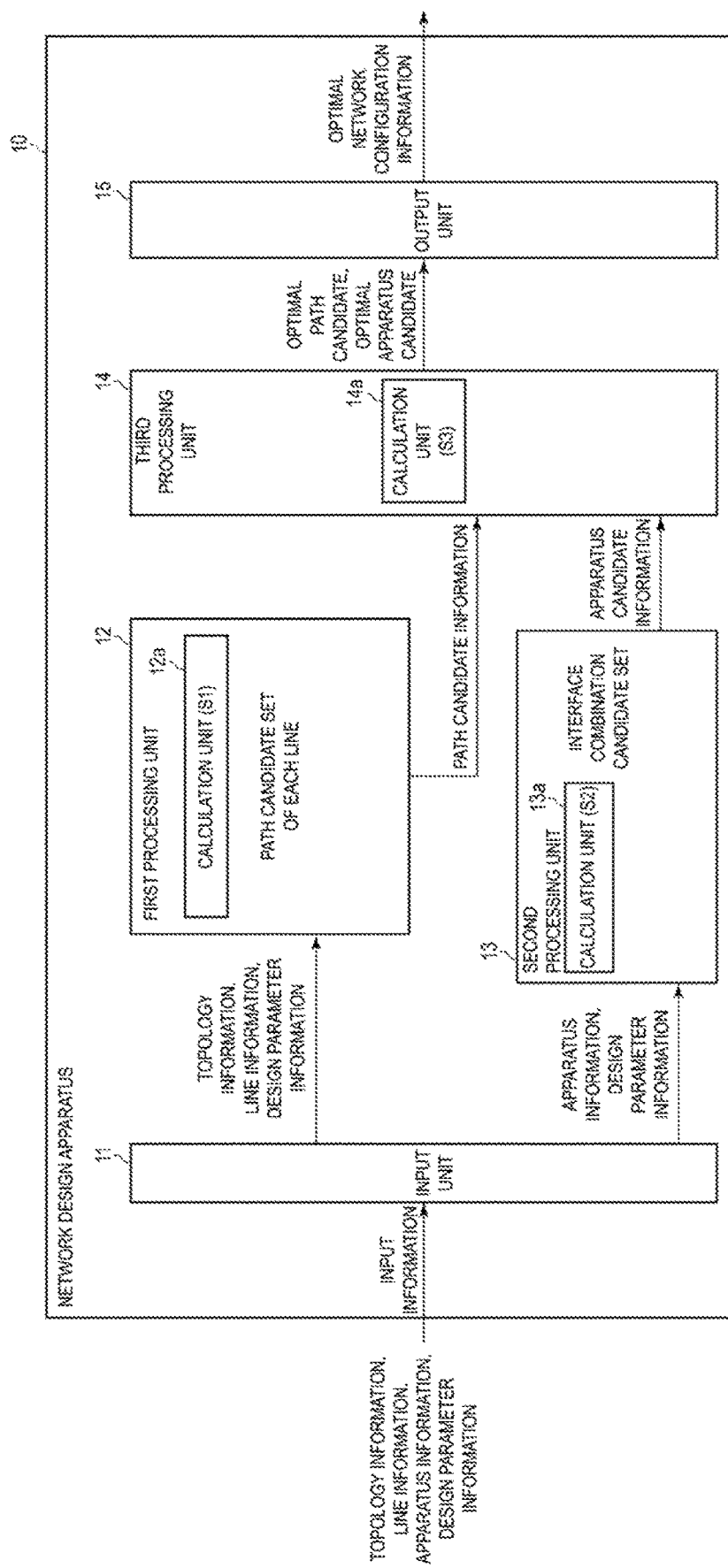
FIG. 2 is a block diagram illustrating an example of a network design apparatus according to a first embodiment of the present invention.

An example of a network design apparatus of the first embodiment is shown. FIG. 2 is a diagram illustrating an example of the network design apparatus according to the first embodiment of the present invention. The network design apparatus 10 outputs optimal network configuration information including optimal path information and optimal equipment information on the basis of input information. The network design apparatus 10 includes an input unit (input reception unit) 11, a first processing unit 12, a second processing unit 13, a third processing unit 14, and an output unit (generation unit) 15.

The first processing unit 12 includes a calculation unit 12a. The second processing unit 13 includes a calculation unit 13a. The third processing unit 14 includes a calculation unit 14a.

An input unit 11, which is an input reception unit, has a function of receiving input information input by a network designer, and outputting the input information to the first processing unit 12 and the second processing unit 13. The input information includes topology information, line information, apparatus information, and design parameter information. The topology information is information on a connection state between communication hubs on the infrastructure network. The line information is information on a plurality of lines accommodated in a network, and the plurality of lines are possessed by each network service. The apparatus information is information on a transfer apparatus disposed at each communication hub on the infrastructure network. Further, the apparatus information also includes information on a link portion apparatus such as an interface, which is installed on each transfer apparatus. The design parameter information is information on parameters that are used in design of a network.

The information including the topology information, the line information, and the design parameter information is input from the input unit 11 to the calculation unit 12a. The calculation unit 12a calculates a path candidate set from the information input from the input unit 11. The calculation unit 12a calculates the path candidate set of each line. The first processing unit 12 outputs the path candidate information including the path candidate set obtained by the calculation unit 12a. The path candidate information is output to the third processing unit 14.

Information including the apparatus information and the design parameter information is input from the input unit 11 to the calculation unit 13a. The calculation unit 13a calculates an interface combination candidate set from the information input from the input unit 11.

The second processing unit 13 outputs apparatus candidate information. The apparatus candidate information is output to the third processing unit 14. An apparatus candidate set includes the interface combination candidate set obtained by the calculation unit 13a.

The path candidate information is input from the first processing unit 12 to the calculation unit 14a, and the apparatus candidate information is input from the second processing unit 13 to the calculation unit 14a. The calculation unit 14a calculates an optimal path candidate and an optimal apparatus candidate from the path candidate information and the apparatus candidate information to be input. The optimal apparatus candidate includes an optimal interface combination candidate. The third processing unit 14 outputs the optimal path candidate and the optimal apparatus candidate obtained by the calculation unit 14a to the output unit 15.

The optimal path candidate and the optimal apparatus candidate are input from the third processing unit 14 to the output unit 15, which is a generation unit. The output unit 15 generates network configuration information reflecting both the optimal path candidate and the optimal apparatus candidate on the basis of the information input from the third processing unit 14. The output unit 15 outputs the network configuration information reflecting the optimal path candidate and the optimal apparatus candidate, as optimal network configuration information, to a terminal apparatus to be operated by the network designer. The optimal network configuration information includes information on an optimal path accommodating each line and optimal equipment information regarding a switch and an interface disposed at each communication hub. The optimal equipment information regarding switches includes information on an optimal disposition of the switches and an optimal capacity of the switches. The optimal equipment information regarding interfaces includes information on an optimal disposition of the interfaces and an optimal capacity of the interfaces. The output unit (generation unit) 15 may store the generated optimal network configuration information in a recording medium or the like instead of outputting the optimal network configuration information to the terminal apparatus or the like.

Input Information

In the first embodiment, an example of the input information input to the input unit 11 of the network design apparatus 10 is shown. The input information is information input to the input unit 11 by a network designer. The input information that the network designer inputs to the input unit 11 of the network design apparatus 10 includes: (1) the topology information; (2) the line information; (3) the apparatus information; and (4) the design parameter information.

(1) The topology information includes (1-1) a connection matrix indicating a connection state between the communication hubs in the infrastructure network, and (1-2) a delay time in a link between the communication hubs.

(2) The line information includes (2-1) a starting point and an ending point of communications in each line, (2-2) a contracted band in each line, (2-3) a tolerance of the inter-end delay in each line, and (2-4) a required degree of path redundancy in each line. (2-1) The starting point and the ending point of the communication in each line indicates a pair of communication hubs serving as end points of the line.

(3) The apparatus information includes information on each switch and information on each interface. Each interface constitutes a link portion apparatus in a switch disposed at the communication hub. The apparatus information includes (3-1) a traffic capacity of each interface, and (3-2) a cost value of each interface.

(4) The design parameter information includes (4-1) the number of path candidates (an upper limit value of the number of path candidates) per line, and (4-2) the number of interface combination candidates (a design value of the number of interface combination candidates).

Overview of Overall Flow and Each Process

Figure 3:
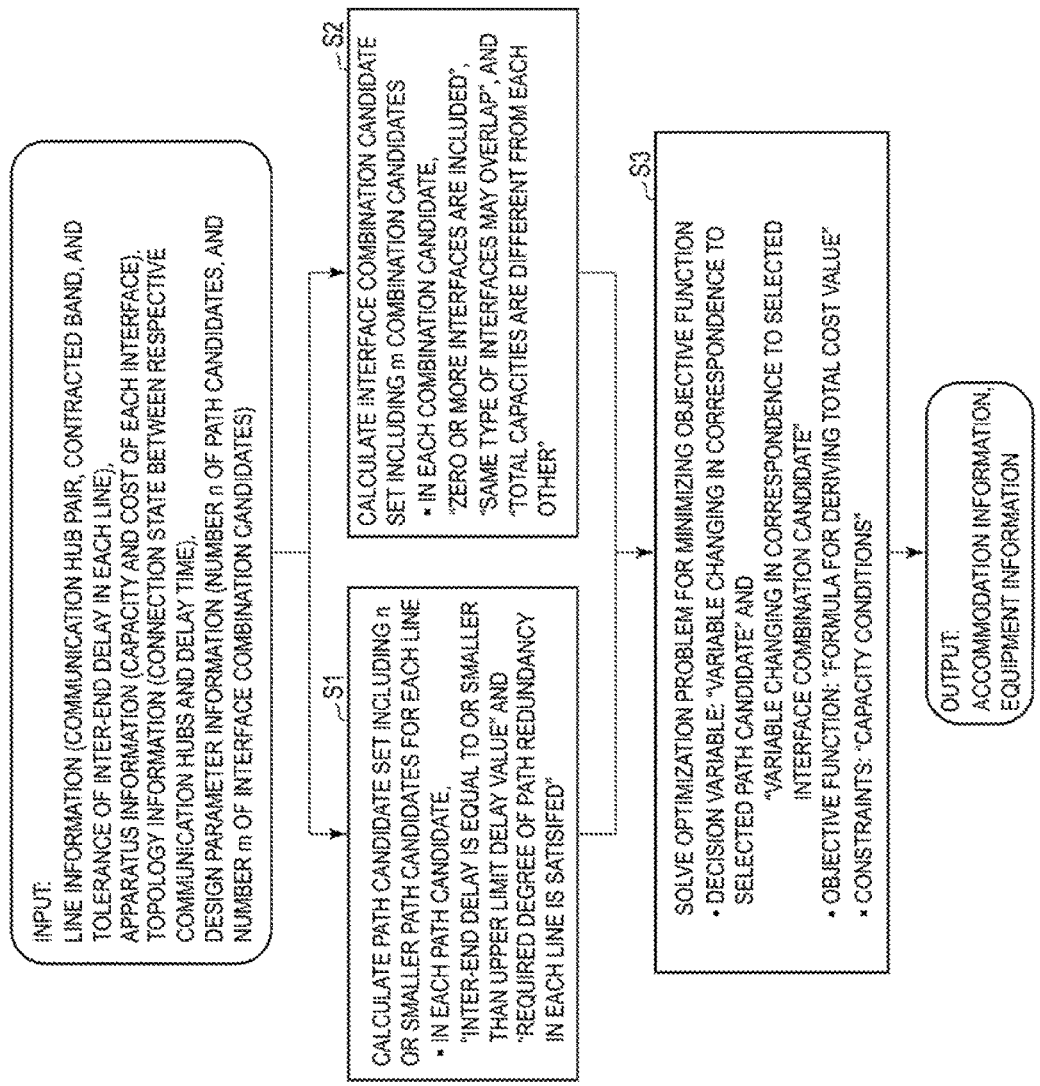
FIG. 3 is a flowchart illustrating an example of an operation procedure of the network design apparatus according to the first embodiment.

FIG. 3 is a flowchart illustrating an operation example procedure of the network design apparatus according to the first embodiment.

In S1, the calculation unit 12a of the first processing unit 12 calculates the path candidate set of each line. In S1, the calculation unit 12a calculates, for each line, an upper limit delay value, which is a threshold value for an inter-end delay. Further, the calculation unit 12a calculates the number of redundant paths for each line. The calculation unit 12a calculates the path candidate set on the basis of the calculated upper limit delay value and the calculated number of redundant paths.

In S2, the calculation unit 13a of the second processing unit 13 calculates an interface combination candidate set.

S3 is performed on the basis of calculation results in S1 and S2 after S1 and S2. In S3, the calculation unit 14a of the third processing unit 14 calculates an optimal path accommodating each line, and a combination candidate for optimal interfaces to be disposed in the switch at each communication hub. The optimal network configuration is calculated on the basis of the optimal path candidates and the optimal interface combination candidates, that is, on the basis of calculation results in S3.

Details of Each Process

Next, details of S1 to S3 will be described.

Calculation of Path Candidate Set (S1)

Figure 4:
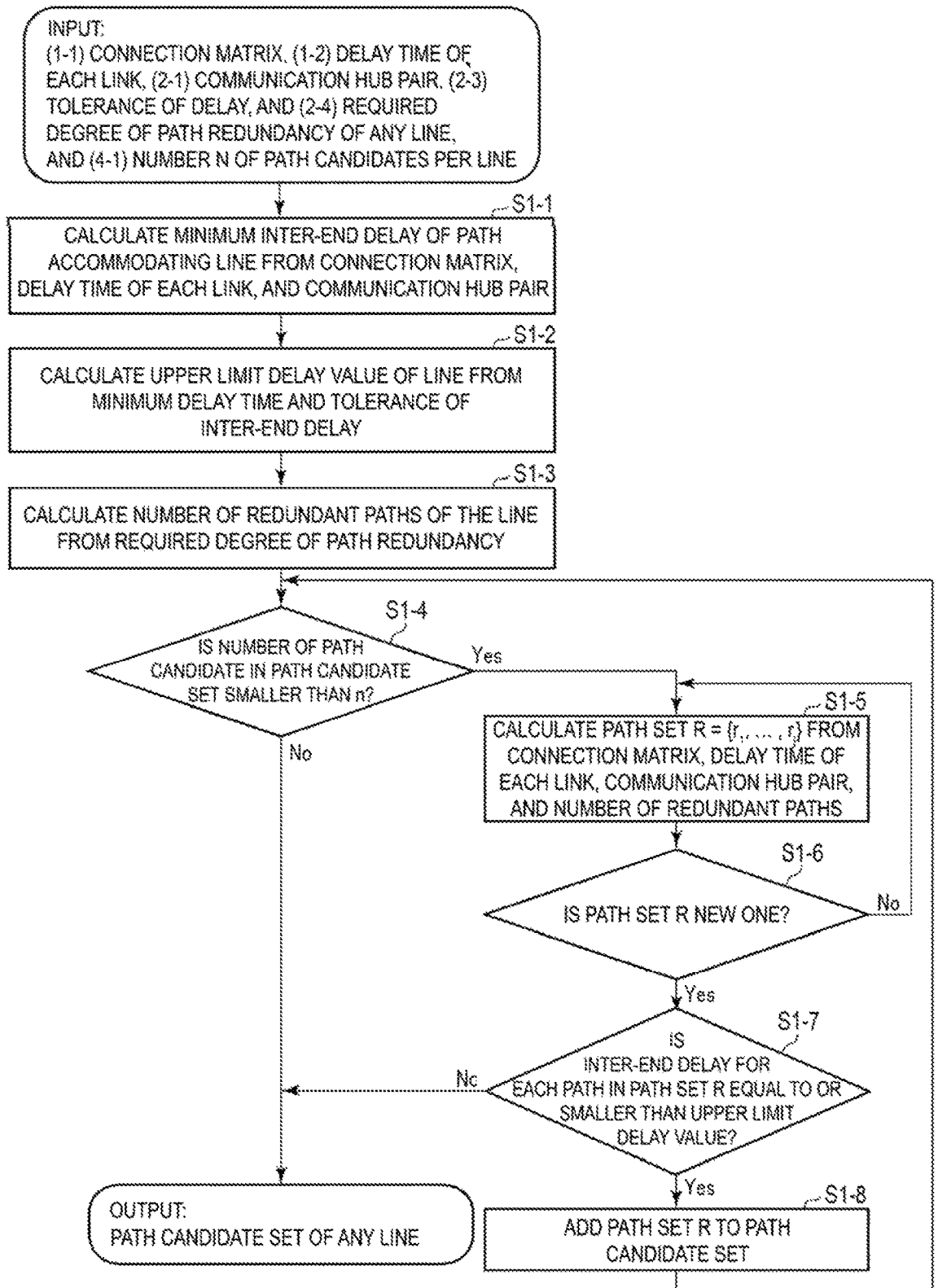
FIG. 4 is a flowchart illustrating an example of a procedure for calculating a path candidate set for any line in the first embodiment.

In the calculation of the path candidate set (S1), the calculation unit 12a of the first processing unit 12 calculates, for each line, an upper limit delay value, which is a threshold value of an inter-end delay, the number of redundant paths, and the path candidate set. The upper limit delay value, the number of redundant paths, and the path candidate set are calculated from (1-1) the connection matrix, (1-2) the delay time of each link, (2-1) a communication hub pair, (2-3) the tolerance of the inter-end delay, (2-4) the required degree of path redundancy, and (4-1) the number of path candidates per line described above. FIG. 4 is a flowchart illustrating an example of a procedure for calculating a path candidate set for any line.

First, in S1-1, the calculation unit 12a of the first processing unit 12 calculates a minimum inter-end delay for a path accommodating any line. The minimum inter-end delay is a minimum value of the inter-end delay of the path accommodating the line. The calculation unit 12a calculates the minimum inter-end delay from (1-1) the connection matrix, (1-2) the delay time of each link, and (2-1) the communication hub pair of the line described above. For example, the calculation unit 12a creates a weighted undirected graph from (1-1) the connection matrix and (1-2) the delay time of each link. The calculation unit 12a calculates a shortest path and a sum of weights of the links in the shortest path in the created weighted undirected graph using a Dijkstra method. In this case, the sum of the weights of the links in the shortest path is calculated as the minimum inter-end delay.

Next, in S1-2, the calculation unit 12a of the first processing unit 12 calculates an upper limit delay value of the line. The calculation unit 12a calculates the upper limit delay value of the line from the minimum inter-end delay calculated in S1-1 and (2-3) the tolerance of the inter-end delay of the line. For example, when the minimum inter-end delay 1 and a numerical value i indicating the tolerance of the inter-end delay of the line have been defined, the calculation unit 12a performs calculation using 1×i as a calculation relationship for the upper limit delay value. The numerical value indicating the tolerance of the inter-end delay described above and a setting of the calculation relationship for the upper limit delay value are examples, and any value or calculation relationship can be set according to the embodiment. Accordingly, the upper limit delay value according to the tolerance of the inter-end delay can be calculated.

Next, in S1-3, the calculation unit 12a of the first processing unit 12 calculates the number i of redundant paths of the line from (2-4) the required degree of path redundancy. For example, when a numerical value indicating the required degree of path redundancy of the line is 0, the calculation unit 12a determines that the required degree of path redundancy is low for that line, and sets the number i of redundant paths of the line to 1. Further, when the numerical value indicating the required degree of path redundancy of the line is 1, the calculation unit 12a determines that the required degree of path redundancy is high for that line, and sets the number i of redundant paths of the line to 2. A setting of the numerical values indicating the required degree of path redundancy and the number i of redundant paths described above is an example, and any value or relationship can be set according to embodiments. Accordingly, the number i of redundant paths according to the required degree of path redundancy can be calculated.

Here, the number i of redundant paths is the number of paths included in the line. For example, in a line in which the number of redundant paths is one, only a main path is accommodated. That is, in a line in which the number of redundant paths is one, the number of paths accommodated in the line becomes one. In a line in which the number of redundant paths is two, a main path and a spare path are accommodated. That is, in a line in which the number of redundant paths is two, the number of paths accommodated in the line becomes two.

Next, in S1-4, the calculation unit 12a of the first processing unit 12 performs a determination from (4-1) the number n of path candidates per line. That is, the calculation unit 12a determines whether the number of path candidates already included in the path candidate set is smaller than n. When the number of path candidates already included in the path candidate set is smaller than n (S1-4: Yes), the process proceeds to S1-5. On the other hand, when the number of path candidates already included in the path candidate set is n or greater (S1-4: No), the first processing unit 12 outputs the path candidate set including the already calculated path candidates. The process of S1 ends.

In S1-5, the calculation unit 12a of the first processing unit 12 calculates a path set R. In this case, the calculation unit 12a calculates the path set R={r1, r2, . . . , rj} from (1-1) the connection matrix, (1-2) the delay time of each link, (2-1) the pair of communication hubs, and the number i of redundant paths calculated in S1-3. The path set R includes one or more paths. The number of paths included in the path set R is the same as the number of redundant paths i. Further, in the paths included in the path set R, combinations of the links to be used are different from each other. That is, in S1-5, the calculation unit 12a of the first processing unit 12 calculates a path set including paths as many as the number of redundant paths in the line. Each path included in the path set R is calculated, for example, using a k-shortest path algorithm (see reference "Jin Y. Yen," Finding the K Shortest Loopless Paths in a Network", Management Science, vol. 17, No. 11, pp. 712-716, 1971"). For example, it is assumed that a weighted graph G, a starting point s, and an ending point t have been assigned. In the k-shortest path algorithm, k paths that do not include a loop from s to t are searched for in ascending order of cost. Accordingly, in S1-5, the calculation unit 12a calculates the new path in ascending order of the inter-end delay using the k-shortest path algorithm.

Next, in S1-6, the calculation unit 12a of the first processing unit 12 determines whether the calculated path set R is a new one. In this case, the calculation unit 12a determines whether the calculated path set R is different from the path set already added as a path candidate in the path candidate set calculated in S1. When the calculated path set R is a new one, that is, when the calculated path set R is different from the path set already included in the path candidate set calculated in S1 (S1-6: Yes), the process proceeds to S1-7. On the other hand, when the calculated path set R is not a new one, that is, when the calculated path set R is already included in the path candidate set calculated in S1 (S1-6: No), the process returns to S1-5 and calculates the path set R again.

Next, in S1-7, the calculation unit 12a of the first processing unit 12 calculates the inter-end delay for each path included in the path set R calculated in S1-5. The calculation unit 12a determines whether each of the calculated inter-end delays is equal to or smaller than the upper limit delay value calculated in S1-2. When the inter-end delay of each path included in the path set R is equal to or smaller than the upper limit delay value (S1-7: Yes), the process proceeds to S1-8. On the other hand, when the inter-end delay of the path set R is greater than the upper limit delay value (S1-7: No), the first processing unit 12 outputs the path candidate set including the path candidate already calculated. Thus, the path set R calculated in S1-5 is not included in the path candidate set.

Next, in S1-8, the calculation unit 12a of the first processing unit 12 adds the path set R calculated in S1-5 to the path candidate set as one path candidate. The process returns to S1-4.

By the S1-4 to S1-8 being performed as described above, the path set R is added to the path candidate set as a path candidate as long as the number of path candidates in the path candidate set is smaller than n and the inter-end delay of each path included in the path set R is equal to or smaller than the upper limit delay value. Thus, in the path candidate set of any line output in S1, the number of path candidates is equal to or smaller than n. Further, in the path candidate set of any line output in S1, an inter-end delay of each path included in a path set of path candidates is equal to or smaller than the upper limit delay value of the line. In the path candidate set of any line output in S1, paths different in a combination of links to be used are included by the same number as the number of redundant paths in the line in path set of path candidates. Here, n is the number of path candidates per line (an upper limit value of the number of path candidates) and is input by a network designer, as described above.

In the embodiment, the path candidate set is calculated in each line using the procedure of S1 described above. The path candidate set of each line calculated in S1 is used as an input of S3.

Figure 5:
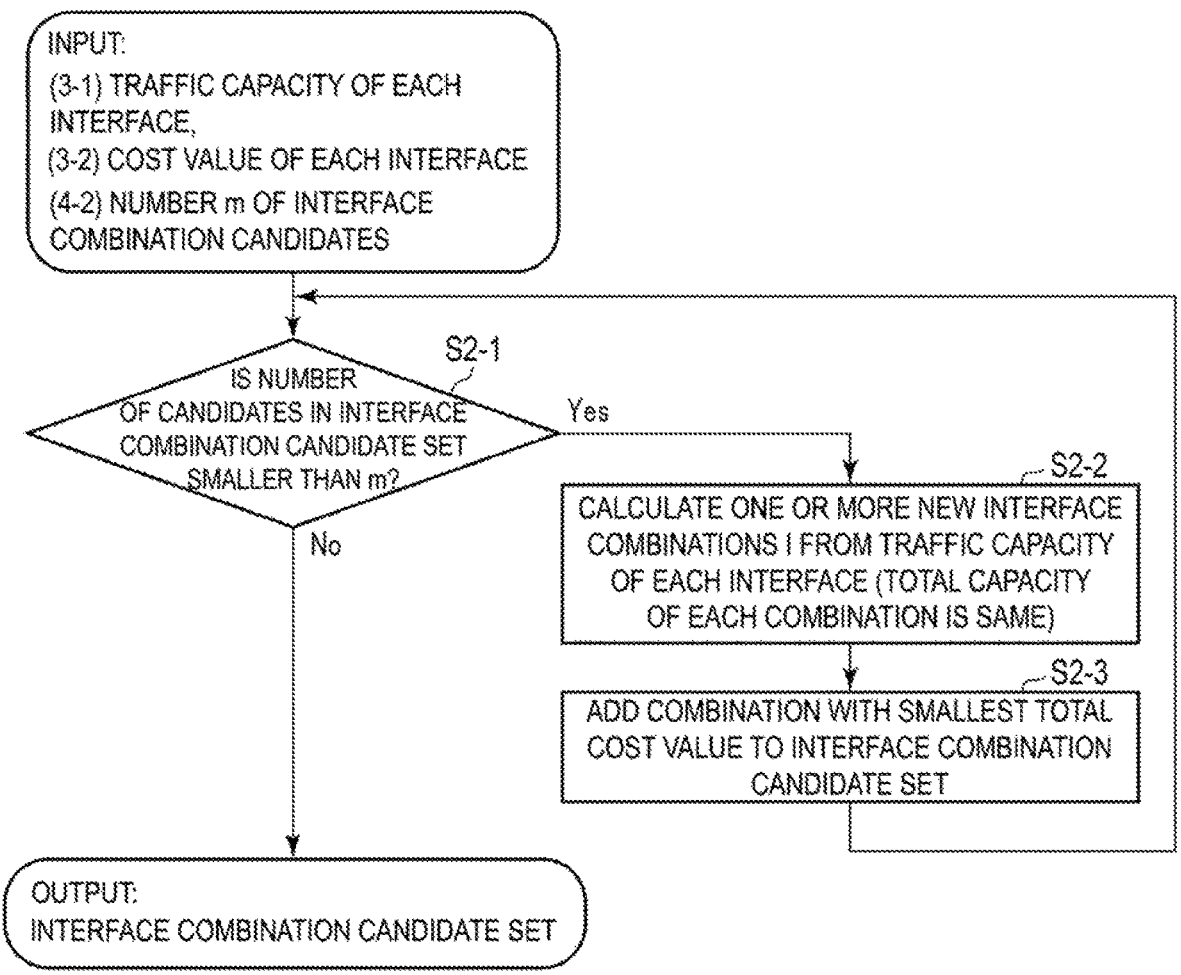
FIG. 5 is a flowchart illustrating an example of a procedure for calculating an interface combination candidate set in the first embodiment.

Calculation of Interface Combination Candidate Set (S2)
In calculation of an interface combination candidate set (S2), the calculation unit 13a of the second processing unit 13 calculates the interface combination candidate set. The calculation unit 13a calculates the interface combination candidate set from (3-1) the traffic capacity of each interface and (4-2) the number m of interface combination candidates. The calculated interface combination candidate set includes m combination candidates for an interface combination. Each combination candidate is a combination of zero or more interfaces, and in each combination candidate, a plurality of interfaces with the same traffic capacity may be overlapped and combined. Each combination candidate also includes a combination in which there is no interface used. FIG. 5 is a flowchart illustrating an example of a procedure for calculating the interface combination candidate set.

First, in S2-1, the calculation unit 13a of the second processing unit 13 performs a determination from (4-2) the number m of interface combination candidates. That is, the calculation unit 13a determines whether the number of combination candidates already included in the interface combination candidate set is smaller than m. When the number of combination candidates already included in the interface combination candidate set is smaller than m (S2-1: Yes), the process proceeds to S2-2. On the other hand, when the number of combination candidates already included in the interface combination candidate set is equal to or greater than m (S2-1: No), the second processing unit 13 outputs the interface combination candidate set including the already calculated combination candidates.

Next, in S2-2, the calculation unit 13a of the second processing unit 13 calculates one or more new interface combinations I. The calculation unit 13a calculates the new combination I from (3-1) the traffic capacity of each interface. In this case, the calculation unit 13a may calculate a plurality of new combinations I. In the plurality of new combinations I to be calculated, however, total capacities, which are the sums of the traffic capacities of the interfaces, are the same as each other. Further, each new combination I to be calculated is a combination of zero or more interfaces, and in each combination I, a plurality of interfaces of the same type are allowed to overlap. The interfaces with the same traffic capacities correspond to the same types of interfaces. Further, each time the process of S2-2 is repeated, the calculation unit 13a calculates the new combination I in ascending order of the total capacity of the interfaces included in the combination.

Next, in S2-3, the calculation unit 13a of the second processing unit 13 selects one of the new combinations I calculated in S2-2 from (3-2) the cost value of each interface. In this case, the calculation unit 13a selects one combination in which a total cost value that is a sum of the cost values of the interfaces is smallest, from among the combinations I. The calculation unit 13a adds the one combination selected from among the combinations I to the interface combination candidate set.

By S2-1 to S2-3 being performed as described above, m combination candidates are included in the interface combination candidate set output in S2, and total capacities of the respective combination candidates are prime to each other. That is, the m combination candidates included in the interface combination candidate set differ in the total capacity of the interfaces. Further, each combination candidate is a combination of zero or more interfaces, and in each combination candidate, a plurality of interfaces of the same type are allowed to be overlap. Further, each combination candidate has a candidate number. The candidate number is set to a natural number between 1 and m. When the candidate number becomes greater, the total capacity of the interfaces included in the combination increases.

In the embodiment, the interface combination candidate set is calculated using the procedure of S2 described above. The interface combination candidate set calculated in S2 is used as an input of S3.

Calculation of Optimal Network Configuration (S3) In calculation of the optimal network configuration (S3), the calculation unit 14a of the third processing unit 14 solves the optimization problem for minimizing the objective function, as in S'3 of NPL 1. That is, the calculation unit 14a uses a variable indicating which path candidate has been selected from the path candidate set as a decision variable. The decision variable indicating the selected path candidate is set for each line. Further, the calculation unit 14a uses a variable indicating which combination candidate has been selected from the interface combination candidate set, as a decision variable. The decision variable indicating the selected combination candidate is set for each link. Further, the calculation unit 14a uses a relationship deriving a total cost of all the interfaces in the infrastructure network as an objective function. The total cost of all the interfaces changes in correspondence to which combination candidate has been selected from the interface combination candidate set.

In the optimization problem of S3, constraints for selecting one path candidate in each line are provided, and the constraints are shown in the relationship (2), as in S'3 described above. The variable x is provided as a decision variable of the optimization problem, and the variable x indicates, for each line, the path candidate selected as a path to be accommodated from the path candidate set. Further, in the optimization problem, constraints for selecting one interface combination candidate is provided for each link, as in S'3 described above, and the constraints are shown in the relationship (3). The variable y is provided as the decision variable of the optimization problem, and the variable y indicates the combination candidate selected as a combination of interfaces to be disposed from the combination candidate set, for each link (for each link portion).

Further, in the optimization problem, the capacity conditions of the relationship (4) are provided as in S'3 described above. That is, in each link (each link portion), a capacity condition is that the total contracted band $t^e$ is equal to or smaller than the total capacity "$\Psi_j^{IF}$" of all the interfaces constituting the selected combination candidate. Thus, in the optimization problem, the combination candidate j selected from the interface combination candidate set needs to satisfy the capacity conditions described above in each link.

Here, the total contracted band $t^e$ of each link is calculated on the basis of the path candidate selected for each line, the contracted band of each line, and the connection matrix indicating the connection state between the communication hubs. Here, the path candidate selected for each line is indicated by the variable x, which is the decision variable, in the relationship (1) to (4) described above. Further, the contracted band of each line is included in the input information described above, and corresponds to a parameter d, which is one of the parameters relevant to the relationship (1) to (4) described above. The connection matrix is included in the input information described above, and corresponds to a parameter M, which is one of the parameters relevant to the relationship (1) to (4). Thus, when the path candidate for each line is selected, the total contracted band te of each link is calculated from the line information and the topology information.

Further, in the optimization problem of S3, the total cost value of all the interfaces on the infrastructure network shown in the relationship (1) is used as an objective function, and an optimization problem for minimizing the objective function is solved, as in S'3 described above. In the relationship (1), $y_j^c \cdot \Omega_j^{IF}$ indicates the total cost value of the interfaces in the selected combination candidate j for the link e. A sum of the total cost values calculated for each link, that is, a sum of the cost values of all the interfaces becomes the objective function. In the calculation of the total cost value of the total interface that is as the objective function, the total cost value of the selected interface combination candidates for each link is calculated. The total cost values of all the links are summed, and a value obtained by doubling the sum is used as a value of the objective function. Doubling the sum is because the selected interface combination candidate is connected to both ends of each link.

The path candidate for each line and the interface combination candidate for each link for minimizing the objective function, which is the total cost value of all the interfaces, are derived by solving the optimization problem. That is, an optimal decision variable x is derived for each line, and an optimal decision variable y is derived for each link (each link portion). The derived path candidate for each line is the optimal path candidate for each line, and the derived interface combination candidate for each link is the optimal interface combination candidate for each link.

As described above, the calculation unit 14a of the third processing unit 14 calculates the optimal path candidates for each line and the optimal interface combination candidates for each link portion at each communication hub by solving the optimization problem. The third processing unit 14 outputs the calculated optimal path candidate and the calculated optimal interface combination candidates to the output unit 15.

In the embodiment, the path candidates included in the path candidate set are configured as a path set that includes the same number of paths as the designated number of redundant paths, as described above. Thus, in the calculation of the optimization problem of S3, the optimal path candidate and the optimal interface combination candidate corresponding to various requirements for redundancy of the paths can be derived.

Operational Example

An operation example in the first embodiment divided into an example of input information and an operation example of each process will be described.

Example of Input Information

Topology Information

Figure 6:
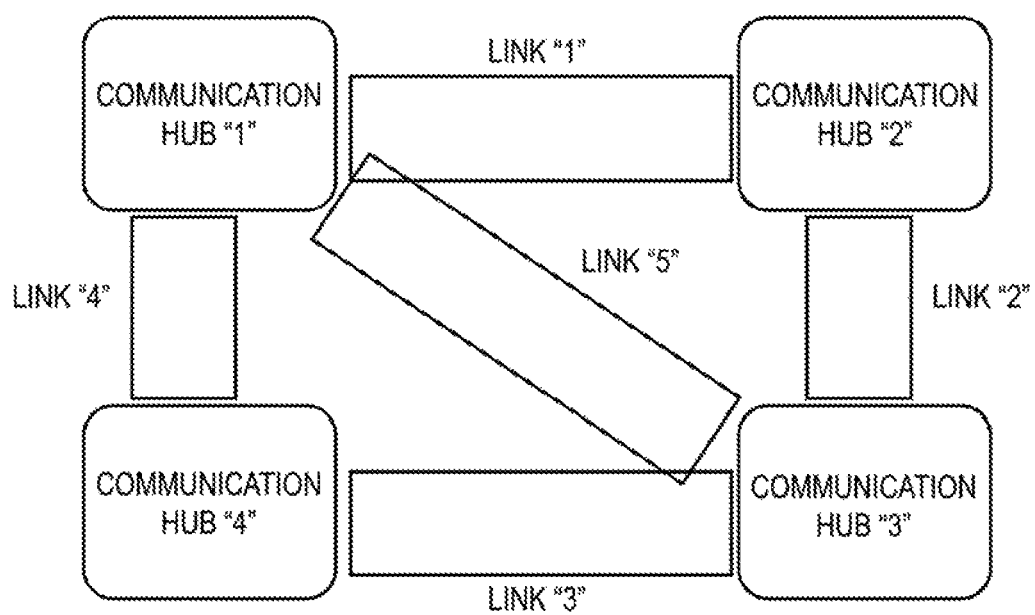
FIG. 6 is a schematic diagram illustrating an example of a topology in an operation example of the first embodiment.
Figure 7:
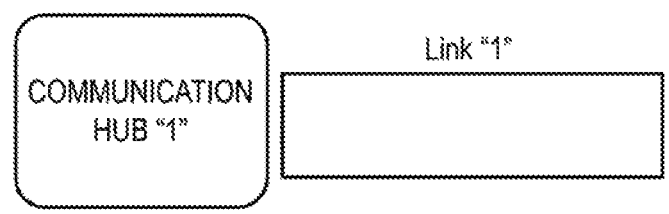
FIG. 7 is a schematic diagram illustrating a model example for use in the example of the topology of FIG. 6.

FIG. 6 is a diagram illustrating an example of the topology. FIG. 7 is a diagram illustrating a model example for use in the example of the topology in FIG. 6. That is, FIG. 7 is a diagram illustrating, for example, symbols used in the example in FIG. 6. In FIG. 7, communication hub "1" indicates a communication hub with the communication hub number of 1. Further, in FIG. 7, link "1" indicates a link with a link number of 1 and is connected to communication hub "1".

FIG. 6 illustrates a connection state between communication hubs. Specifically, a connection state of communication hubs corresponding to communication hubs "1" to "4" via link "1" to link "5" is shown. The connection matrix M indicating the connection state between the communication hubs in the example of FIG. 6 is shown in the relationship (A) below.

[Math. 3]

$$M = \begin{pmatrix} 1 & 0 & 0 & 1 & 1 \\ 1 & 1 & 0 & 0 & 0 \\ 0 & 1 & 1 & 0 & 1 \\ 0 & 0 & 1 & 1 & 0 \end{pmatrix} \quad (A)$$

In the connection matrix M, each row corresponds to a communication hub, and each column corresponds to a link. When the link is connected to the communication hub, "1" is stored in a corresponding portion of the connection matrix M. On the other hand, when the link is not connected to the communication hub, "0" is stored in the corresponding portion of the connection matrix M.

Further, an example of the delay time in each link is shown as the topology information in Table 1 below. In Table 1, a delay time between the communication hubs is shown.

TABLE 1

| Link No. | Delay time |
| --- | --- |
| 1 | 2 |
| 2 | 1 |
| 3 | 2 |
| 4 | 1 |
| 5 | 4 |

Line Information

Next, an example of information on the line accommodated in the network is shown in Table 2 below.

TABLE 2

| Line No. | Communication hub pair | Contracted band | Tolerance of inter-end delay | Required degree of path redundancy |
|---|---|---|---|---|
| 1 | 1, 3 | 10 | 1 | 0 |
| 2 | 1, 3 | 10 | 1 | 1 |
| 3 | 1, 3 | 10 | 0 | 0 |
| 4 | 1, 3 | 10 | 0 | 1 |

In an example of Table 2, in line "1" with the line number of "1", communication of a contracted band "10" is performed between communication hub "1" and communication hub "3". Line "1" has the tolerance of the inter-end delay of "0". Further, line "1" has a required degree of path redundancy of "1". Here, in the example of Table 2, the tolerance of the inter-end delay is set to a value of 0 or 1. In this example, when the tolerance of the inter-end delay is 1, the tolerance is determined to be high, and a delay time of twice the inter-end delay of the shortest path is set as the upper limit delay value. On the other hand, when the tolerance of the inter-end delay is 0, the tolerance is determined to be low, and the inter-end delay of the shortest path is set as the upper limit delay value.

Further, in the example of Table 2, the required degree of path redundancy is set to a value of 0 or 1. In the example, when the required degree of path redundancy is 1, the required degree is determined to be low and only the main path is included. Thus, when the required degree of path redundancy is 1, the line includes one path. On the other hand, when the required degree of path redundancy is 0, the required degree is determined to be high and the main path and the spare path are included. That is, when the required degree is 0, the line includes two paths.

Apparatus Information

Next, an example of information on a switch that is a transfer apparatus (network apparatus) disposed at the communication hub and an interface (link portion apparatus) installed in the link portion of the switch will be described.

Figure 8:
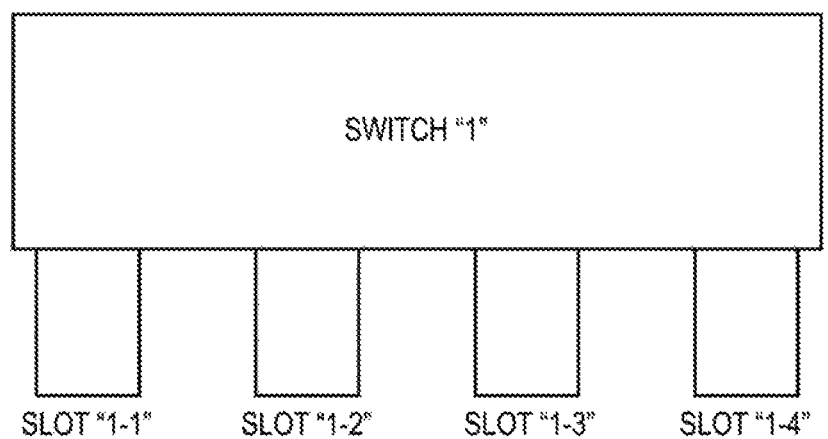
FIG. 8 is a schematic diagram illustrating an example of a switch in the operation example in the first embodiment.

FIG. 8 illustrates an example of the switch. The switch in the example of FIG. 8 is a switch "1" with a switch number "1" and includes a slot "1-1", a slot "1-2", a slot "1-3", and a slot "1-4". The switch "1" receives data in which a destination is indicated. The switch "1" determines a slot to output the data on the basis of the destination indicated in the data. Accordingly, a link that outputs the data is determined.

The slot corresponds to a connection portion (link connection portion) between a communication hub and the link. Further, the slot accommodates an interface.

Figure 9:
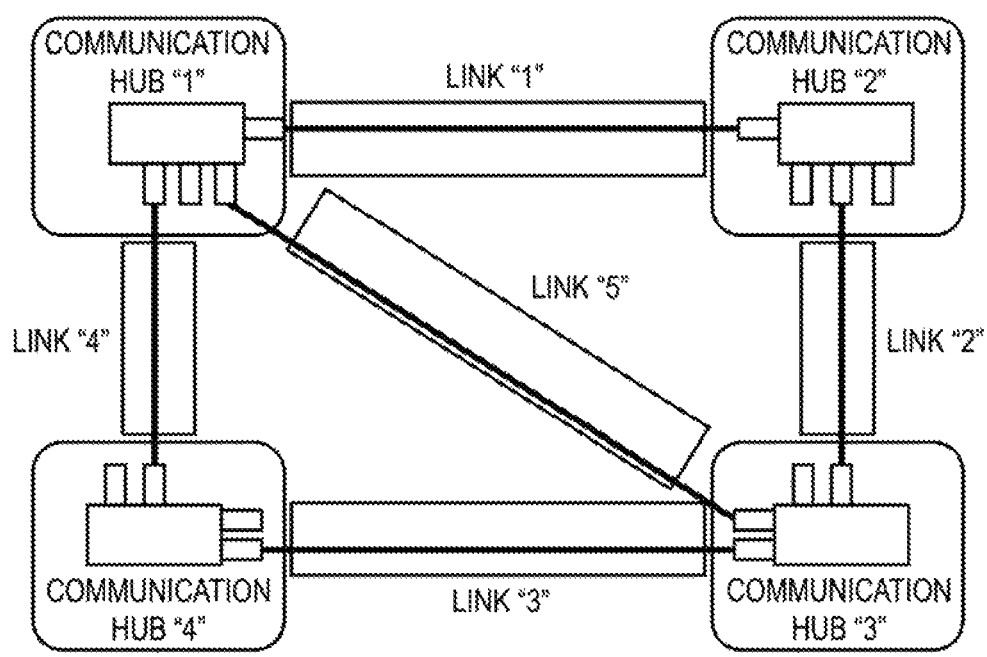
FIG. 9 is a schematic diagram illustrating an example of disposition of switches in an infrastructure network illustrated in FIG. 6.

FIG. 9 illustrates an example of disposition of switches in the infrastructure network illustrated in FIG. 6. Thus, in FIG. 9, an example of a method of connecting switches in the topology of FIG. 6 is shown. In an example of FIG. 9, a switch is installed in communication hubs "1" to "4". The slots of each switch are connected by a cable via a link, and the respective communication hubs are connected.

Next, an example of information on the switch is shown in Table 3 below.

TABLE 3

| Transfer apparatus | Number of slots | Traffic capacity per slot |
|---|---|---|
| Switch "1" | 4 | 100 Gbit/s |
| Switch "2" | 8 | 100 Gbit/s |
| Switch "3" | 16 | 100 Gbit/s |

In an example of Table 3, information on switches with switch numbers of "1" to "3" is shown. In the example of Table 3, switch "1" with the switch number of "1" includes four slots. Further, in switch "1", a total amount of traffic capacity that can be processed is 400 Gbit/s because a traffic capacity per slot is 100 Gbit/s. The total amount of traffic capacity is a sum of the traffic capacities of the slots provided in the switch.

Further, an example of information on the interface is shown in Table 4 below.

TABLE 4

| Link portion apparatus | Traffic Capacity | Cost value | Capacity |
|---|---|---|---|
| Interface "1" | 10 Gbit/s | 1 | 1 per slot |
| Interface "2" | 40 Gbit/s | 3 | 1 per slot |
| Interface "3" | 100 Gbit/s | 5 | 1 per slot |

In the example of Table 4, information on interfaces with interface numbers of "1" to "3" is shown. In the example of Table 4, in interface "1" with the interface number of "1", a traffic capacity that can be processed is 10 Gbit/s. One interface "1" can be installed in one slot and has a cost value of 1.

Design Parameter Information

An example of the design parameter information is shown in Table 5 below. In the example of Table 5, the design parameter information includes the number of path candidates per line (an upper limit value of the number of path candidates), and the number of interface combination candidates (a design value of the number of interface combination candidates).

TABLE 5

| | |
|---|---|
| Number of path candidates per line | 3 |
| Number of interface combination candidates | 10 |

Example of Operation of Each Process

Calculation of Path Candidate Set (S1)

First, in S1-1, a minimum inter-end delay of each line is calculated. Table 6 below shows an example of a minimum inter-end delay of each line. In Table 6, for example, a minimum inter-end delay when the input information described above in the operation example has been input is shown.

TABLE 6

| Line No. | Communication hub pair | Minimum inter-end delay |
|---|---|---|
| 1 | 1, 3 | 3 |
| 2 | 1, 3 | 3 |
| 3 | 1, 3 | 3 |
| 4 | 1, 3 | 3 |

In an example of Table 6, in a communication hub pair of communication hub "1" and communication hub "3", the inter-end delay has a minimum value in a path passing through link "1", communication hub "2", and link "2" and a path passing through link "4", communication hub "4", and link "3". Thus, the inter-end delay in the path passing through link "1", communication hub "2", and link "2" or the inter-end delay in the path passing through link "4", communication hub "4", and link "3" is set as the minimum inter-end delay. From Table 1 described above, the delay time of link "1" is 2, and the delay time of link "2" is 1. Thus, the inter-end delay in the path passing through link "1", communication hub "2", and link "2" becomes "2+1=3". Each line has a communication hub pair of communication hub "1" and communication hub "3". Thus, in each line, the minimum inter-end delay is "3".

Next, in S1-2, the upper limit delay value of each line is calculated. Table 7 below shows an example of the upper limit delay value of each line. In Table 7, for example, the upper limit delay value when the input information described above in the operation example is input and the minimum inter-end delay is calculated as in Table 6 of the operation example is shown.

TABLE 7

| Line No. | Communication hub pair | Tolerance of inter-end delay | Minimum inter-end delay | Upper limit delay value |
|---|---|---|---|---|
| 1 | 1, 3 | 1 | 3 | 6 |
| 2 | 1, 3 | 1 | 3 | 6 |
| 3 | 1, 3 | 0 | 3 | 3 |
| 4 | 1, 3 | 0 | 3 | 3 |

In an example of Table 7, line "1" and line "2" with the tolerance of the inter-end delay of 1 are determined to be high in the tolerance. Thus, in line "1" and line "2", a delay time twice the minimum inter-end delay is set as the upper limit delay value, and the upper limit delay value is 6. On the other hand, line "3" and line "4" with the tolerance of the inter-end delay of 0 are determined to be low in the tolerance. Thus, in line "3" and line "4", the minimum inter-end delay is set as the upper limit delay value, and the upper limit delay value is 3.

Next, in S1-3, the number of redundant paths for each line is calculated. Table 8 below shows an example of the number of redundant paths for each line. In Table 8, for example, the number of redundant paths when the input information described above in the operation example has been input and the required degree of path redundancy has been input as in Table 3 of the present operation is shown.

TABLE 8

| Line No. | Communication hub pair | Required degree of path redundancy | Number of redundant paths |
|---|---|---|---|
| 1 | 1, 3 | 0 | 1 |
| 2 | 1, 3 | 1 | 2 |
| 3 | 1, 3 | 0 | 1 |
| 4 | 1, 3 | 1 | 2 |

In the example of Table 8, line "1" and line "3" in which the required degree of path redundancy is 0 is determined to be low in the required degree of path redundancy. Thus, the number of redundant paths is set to 1 in line "1" and line "3". On the other hand, line "2" and line "4" in which the required degree of path redundancy is 1 is determined to high in the required degree of path redundancy. Thus, in line "2" and line "4", the number of redundant paths is 2.

Next, the path candidates in each line are calculated in S1-4 to S1-8. When the input information shown in one example of the input information has been input, the path candidates are calculated on the basis of the number of path candidates of 3 per line set in Table 5. Thus, in each line, a maximum of three path candidates are calculated. Further, each path included in the path candidate has an inter-end delay that is equal to or smaller than the upper limit delay value. Further, each path candidate includes a combination of links that differs from each other by the number of redundant paths.

Table 9 below shows an example of path candidates of each line to be calculated, and shows an example of the path candidate set. In Table 9, for example, the path candidate set when the input information described above is input in the operation example and the upper limit delay value is calculated as in Table 7 of the operation example is shown.

TABLE 9

| Line No. | Upper limit delay value | Number of redundant paths | Path candidate | Used link |
|---|---|---|---|---|
| 1 | 6 | 1 | 1-1 | Link "1", link "2" |
|   |   |   | 1-2 | Link "3", link "4" |
|   |   |   | 1-3 | Link "5" |
| 2 | 6 | 2 | 2-1 | {link "1", link "2"}, {link "3", link "4"} |
|   |   |   | 2-2 | {Link"1", Link "2"}, {link "5"} |
|   |   |   | 2-3 | {link "3", link "4"}, {link "5"} |
| 3 | 3 | 1 | 3-1 | Link "1", link "2" |
|   |   |   | 3-2 | Link "3", link "4" |
|   |   |   | 3-3 | — |
| 4 | 3 | 2 | 4-1 | {link "1", link "2"}, {link "3", link "4"} |
|   |   |   | 4-2 |   |
|   |   |   | 4-3 | — |

In the example of Table 9, line "1" has an upper limit delay value of "6" and the number of redundant paths of "1". Thus, in line "1", a path set including one path with an inter-end delay of "6" or less is a path candidate. Thus, in path candidates "1-1" and "1-2" of line "1", a path set including one path with an inter-end delay of "3" is used as a path candidate. In path candidate "1-3" of line "1", a path set including one path with an inter-end delay of "4" is a path candidate.

Line "2" has an upper limit delay value of "6" and the number of redundant paths of "2". Thus, in line "2", a path set including "two" paths with an inter-end delay of "6" or smaller is a path candidate. Thus, in path candidate "2-1" on line "2", a path set including two paths with an inter-end delay of "3" is used as a path candidate. Further, in path candidates "2-2" and "2-3" of line "2", a path set including a path with the inter-end delay of "3" and a path with the inter-end delay of "4" is used as a path candidate.

In S1, by S1-4 to S1-8 being repeated, a path candidate set with the number of path candidates of "3" or smaller is calculated on the basis of the upper limit delay value "6" of line "2" and the number of redundant paths "2". Each of a case in which the path candidate of line "2" is calculated and a case in which the path candidate of line "4" is calculated in S1-4 and S1-8 will be described herein by way of example.

First, an example of the operation of calculating the path candidate for line "2" will be described.

In S1-4 (first time), it is determined whether the number of path candidates in the path candidate set already calculated in S1 is smaller than "3". In S1-4 at first time, the path candidate set is a null set. That is, the number of path candidates in the path candidate set is "0". Thus, the number of path candidates in the path candidate set is determined to be smaller than "3". The process proceeds to S1-5.

In S1-5 (first time), the path set R is calculated for line "2" using the k-shortest path algorithm. Here, line "2" has the number of redundant paths of "2" Thus, the calculated path set R includes two paths in which combinations of links to be used are different from each other. For example, the calculated path set R includes a path r1 and a path r2. The path r1 has an inter-end delay of "3" and uses link "1" and link "2" Further, path r2 has an inter-end delay of "3" and uses link "3" and link "4"

In S1-6 (first time), the candidate set included in the previously calculated path candidate set is compared with the path set R. Here, the path candidate set is a null set, and no path candidates are included in the path candidate set. Thus, the path set R calculated in S1-5 at first time is determined to be a new one. The process proceeds to S1-7.

In S1-7 (first time), each inter-end delay of the paths r1 and r2 included in the path set R is compared to the upper limit delay value "6" of line "2". Here, the inter-end delays of the paths r1 and r2 are "3". Thus, the inter-end delay of each path included in the path set R is determined to be equal to or smaller than the upper limit delay value. The process proceeds to S1-8.

In S1-8 (first time), the path set R including the path r1 and the path r2 is added as path candidate "2-1" to the path candidate set. Thereby, one path candidate is added to the path candidate set, and the number of path candidates in the path candidate set is "1". The process returns to S1-4.

In S1-4 (second time), it is determined whether the number of path candidates in the path candidate set already calculated in S1 is smaller than "3". Here, the number of path candidates in the path candidate set is "1". Thus, the number of path candidates in the path candidate set is determined to be smaller than "3". The process proceeds to S1-5.

In S1-5 (second time), the path set R is calculated using the k-shortest path algorithm. For example, the calculated path set R includes the path r1 and the path r2. The path r1 has an inter-end delay of "3" and uses link "1" and link "2" Further, path r2 has an inter-end delay of "4" and uses link "5".

In S1-6 (second time), the candidate set included in the previously calculated path candidate set is compared with the path set R. Here, the path candidate set includes path candidate "2-1", and path candidate "2-1" includes a path that uses link "1" and link "2", and a path that uses link "3" and link "4". Thus, the path set calculated in S1-5 at second time is different from the path set included in path candidate "2-1". Thus, the path set R calculated in S1-5 at second time is determined to be a new one. The process proceeds to S1-7.

In S1-7 (second time), each inter-end delay of the paths r1 and r2 is compared to the upper limit delay value "6" of line "2" for the path set R calculated in S1-5 at second time. Here, the inter-end delay of path r1 is "3," and the inter-end delay of path r2 is "4." Thus, the inter-end delay of each path included in the path set R is determined to be equal to or smaller than the upper limit delay value. The process proceeds to S1-8.

In S1-8 (second time), the path set R calculated in S1-5 at second time is added as path candidate "2-2" to the path candidate set. Thereby, one path candidate is added to the path candidate set, and the number of path candidates in the path candidate set is "2". The process returns to S1-4.

In S1-4 (third time), it is determined whether the number of path candidates in the path candidate set already calculated in S1 is smaller than "3". Here, the number of path candidates in the path candidate set is "2". Thus, the number of path candidates in the path candidate set is determined to be smaller than "3". The process proceeds to S1-5.

In S1-5 (third time), the path set R is calculated using the k-shortest path algorithm. For example, the calculated path set R includes the path r1 and the path r2. The path r1 has an inter-end delay of "3" and uses link "3" and link "4" Further, path r2 has an inter-end delay of "4" and uses link "5".

In S1-6 (third time), the candidate set included in the previously calculated path candidate set is compared with the path set R. The path set calculated in S1-5 at third time is different from the path set included in path candidate "2-1" and path candidate "2-2". Thus, the path set R calculated in S1-5 at third time is determined to be a new one. The process proceeds to S1-7.

In S1-7 (third time), each inter-end delay of the paths r1 and r2 is compared to the upper limit delay value "6" of line "2" for the path set R calculated in S1-5 at third time. Here, the inter-end delay of path r1 is "3," and the inter-end delay of path r2 is "4." Thus, the inter-end delay of each path included in the path set R is determined to be equal to or smaller than the upper limit delay value. The process proceeds to S1-8.

In S1-8 (third time), the path set R calculated in S1-5 at third time is added as path candidate "2-3" to the path candidate set. Thereby, one path candidate is added to the path candidate set, and the number of path candidates in the path candidate set is "3". The process returns to S1-4.

In S1-4 (fourth time), it is determined whether the number of path candidates in the path candidate set already calculated in S1 is smaller than "3". Here, the number of path candidates in the path candidate set is "3". Thus, the number of path candidates in the path candidate set is determined not to be smaller than "3". Thus, the path candidate set is output and S1 ends.

First, an example of the operation of calculating the path candidate for line "4" will be described.

In S1-4 (first time), it is determined whether the number of path candidates in the path candidate set already calculated in S1 is smaller than "3". In S1-4 at first time, the path candidate set is a null set. That is, the number of path candidates in the path candidate set is "0". Thus, the number of path candidates in the path candidate set is determined to be smaller than "3". The process proceeds to S1-5.

In S1-5 (first time), the path set R is calculated for line "4" using the k-shortest path algorithm. Here, line "4" has the number of redundant paths of "2" Thus, the calculated path set R includes two paths in which combinations of links to be used are different from each other. For example, the calculated path set R includes a path r1 and a path r2. The path r1 has an inter-end delay of "3" and uses link "1" and link "2" Further, path r2 has an inter-end delay of "3" and uses link "3" and link "4"

In S1-6 (first time), the candidate set included in the previously calculated path candidate set is compared with the path set R. Here, the path candidate set is a null set, and no path candidates are included in the path candidate set. Thus, the path set R calculated in S1-5 at first time is determined to be a new one. The process proceeds to S1-7.

In S1-7 (first time), an inter-end delay of the paths r1 and r2 included in the path set R is compared to the upper limit delay value "3" of line "4". Here, the inter-end delay of the paths r1 and r2 is "3". Thus, the inter-end delay of each path included in the path set R is determined to be equal to or smaller than the upper limit delay value. The process proceeds to S1-8.

In S1-8 (first time), the path set R including the path r1 and the path r2 is added as path candidate "4-1" to the path candidate set. Thereby, one path candidate is added to the path candidate set, and the number of path candidates in the path candidate set is "1". The process returns to S1-4.

In S1-4 (second time), it is determined whether the number of path candidates in the path candidate set already calculated in S1 is smaller than "3". Here, the number of path candidates in the path candidate set is "1". Thus, the number of path candidates in the path candidate set is determined to be smaller than "3". The process proceeds to S1-5.

In S1-5 (second time), the path set R is calculated using the k-shortest path algorithm. For example, the calculated path set R includes the path r1 and the path r2. The path r1 has an inter-end delay of "3" and uses link "1" and link "2" Further, path r2 has an inter-end delay of "4" and uses link "5".

In S1-6 (second time), the candidate set included in the previously calculated path candidate set is compared with the path set R. Here, the path candidate set includes path candidate "4-1", and path candidate "4-1" includes a path that uses link "1" and link "2", and a path that uses link "3" and link "4". Thus, the path set calculated in S1-5 at second time is different from the path set included in path candidate "4-1". Thus, the path set R calculated in S1-5 at second time is determined to be a new one. The process proceeds to S1-7.

In S1-7 (second time), each inter-end delay of the paths r1 and r2 is compared to the upper limit delay value "3" of line "4" for the path set R calculated in S1-5 at second time. Here, the inter-end delay of the path r1 is "3," and the inter-end delay of the path r2 is "4." Thus, the inter-end delay "4" of the path r2 is greater than the upper limit delay value "3" of line "4" Thus, the inter-end delay of each path included in the path set R is determined not to be equal to or smaller than the upper limit delay value. Thus, the path candidate set is output and S1 ends.

Calculation of Interface Combination Candidate Set (S2)
Table 10 below shows an example of an interface combination candidate set to be calculated. In Table 10, for example, the interface combination candidate set when the input information described above in the present operation example has been input is shown.

TABLE 10

| Candidate No. of interface combination candidate | Combination | Total capacity | Total cost value |
| --- | --- | --- | --- |
| 1 | — | 0 | 0 |
| 2 | Interface "1" | 10 | 1 |
| 3 | Interface "1" * 2 | 20 | 2 |
| 4 | Interface "1" * 3 | 30 | 3 |
| 5 | Interface "2" | 40 | 3 |
| 6 | Interface "2", interface "1" * 1 | 50 | 4 |
| 7 | Interface "2", interface "1" * 2 | 60 | 5 |
| 8 | Interface "2", interface "1" * 3 | 70 | 6 |
| 9 | Interface "2" * 2 | 80 | 6 |
| 10 | Interface "2" * 2, interface "1" * 1 | 90 | 7 |

In the calculation of the interface combination candidate set, one or more new combinations of interfaces are calculated each time S2-2 is repeated. In S2-2, a total capacity of interfaces included in the new combination to be calculated is different each time, and a new combination is calculated in ascending order of the total capacity each time the process of S2-2 is repeated. Thus, in S2-2, the interfaces included in the new combination to be calculated form different combinations each time.

For example, a case in which combinations of interfaces with a total capacity of "40 Gbit/s" are calculated in S2-2 will be described. In this case, a combination in which four interfaces with a capacity of "10 Gbit/s" are included, and a combination in which one interface with a capacity of "40 Gbit/s" is included are calculated as the combinations of interfaces with a total capacity of "40 Gbit/s".

In S2-3, the total cost value of the combination calculated in S2-2 is calculated. Here, the total cost value of the combination in which four interfaces with a capacity of "10 Gbit/s" are included is "1*4=4", and the total cost value of the combination in which one interface with a capacity of "40 Gbit/s" is included is "3*1=3". That is, the combination in which one interface with a capacity of "40 Gbit/s" is included among the combinations calculated in S2-2 has the smallest total cost value. Thus, in S2-3, a combination including one interface with a capacity of "40 Gbit/s" is added to the interface combination candidate set as a combination candidate.

When the input information described above in the operation example has been input, the process of S2-1 is performed on the basis of the number of interface combination candidates of 10 set in Table 5. That is, in S2-1, it is determined whether the number of calculated combination candidates is smaller than 10. Accordingly, ten combination candidates with different total capacities are calculated for the combination of interfaces. Further, candidate numbers "1" to "10" are set for the combination candidates.

Calculation of Optimal Network Configuration (S3)
In S3, the optimization problem described above is solved. Table 11 illustrates an example of the optimal path candidates of each line calculated in the optimization problem. For example, in the operation example, when S1 and S2 have been performed as described above, the optimal path candidates of each line are calculated as in Table 11. Table 12 illustrates an example of the optimal interface combination candidates of each link calculated in the optimization problem. For example, in the operation example, when S1 and S2 have been performed as described above, the optimal interface combination candidates of each link are calculated as in Table 12.

TABLE 11

| Line No. | No. of selected path candidate |
| --- | --- |
| 1 | 1-1 |
| 2 | 2-1 |
| 3 | 3-1 |
| 4 | 4-1 |

TABLE 12

| Link No. | Candidate No. of selected interface combination candidate |
| --- | --- |
| 1 | 5 |
| 2 | 5 |
| 3 | 3 |
| 4 | 3 |
| 5 | 1 |

That is, when S1 and S2 have been performed as described above in the operation example, path "1-1" is calculated as the optimal path candidate for line "1", path "2-1" is calculated as the optimal path candidate for line "2", path "3-1" is calculated as the optimal path candidate for line "3", and path "4-1" is calculated as the optimal path candidate for line "4". In line "1" and line "3", a path candidate including only a path that uses link "1" and link "2" are calculated as an optimal path. In line "2" and line "4", a path candidate including two paths including the path using link "1" and link "2" and a path using link "3" and link "4" is calculated as the optimal path.

In S3, the total contracted band to for each link is calculated on the basis of the selected path candidates for each line. In the example of Table 11, four lines with the contracted band of "10 Gbit/s" are accommodated in link "1" and link "2". Thus, in link "1" and link "2", the total contracted band is "10*4=40 Gbit/s". Two lines with the contracted band of "10 Gbit/s" are accommodated in link "3" and link "4". Thus, in link "3" and link "4", the total contracted band is "10*2=20 Gbit/s". No line is accommodated in link "5". Thus, the total contracted band of link "5" is "0".

Further, when S1 and S2 have been performed as described above in the present operation example, the combination candidate with the candidate numbers of "5" is calculated as the optimal interface combination candidate for links "1" and "2", the combination candidate with the candidate numbers of "3" is calculated as the optimal interface combination candidate for links "3" and "4", and the combination candidate with the candidate numbers of "1" is calculated as the optimal interface combination candidate for link "5", as shown in Table 12. For each link, the total capacity of the interface in the calculated combination candidate is equal to or greater than the total contracted band, as shown in the relationship (4).

In link "1", the combination candidate with the candidate number of "5" is calculated as the optimal interface combination candidate. Therefore, one interface "2" is installed in each link portion to which link "1" is connected. Thus, one interface "2" is installed in each link portion corresponding to link "1" at communication hub "1" and communication hub "2".

Similarly, because the combination candidate with the candidate number of "5" is calculated as the optimal interface combination candidate in link "2", one interface "2" is installed in each link portion corresponding to link "1" at communication hub "2" and communication hub "3".

In link "3", the combination candidate with the candidate number of "3" is calculated as the optimal interface combination candidate. Therefore, two interfaces "1" are installed in the link portion to which link "3" is connected. Thus, at the communication hub "3" and the communication hub "4", two interfaces "1" are installed in each link portion corresponding to link "3".

Similarly, because the combination candidate with the candidate number of "3" is calculated as the optimal interface combination candidate in link "4", two interfaces "1" are installed in each link portion corresponding to link "4" at communication hub "1" and communication hub "4".

Further, in link "5", the combination candidate with the candidate number of "1" is calculated as the optimal interface combination candidate. Thus, no interface is installed in the link portion to which link "5" is connected.

Thus, eight interfaces "1" with a cost value of 1 and four interfaces "2" with a cost value of 3 are installed on the infrastructure network including links "1" to "5". Therefore, a sum of the cost values of all the interfaces is "1*8+3*4=20".

As described above, in the operation example, a sum of the total cost values of all the interface in the overall infrastructure network is "20", which is a minimum value.

Figure 10:
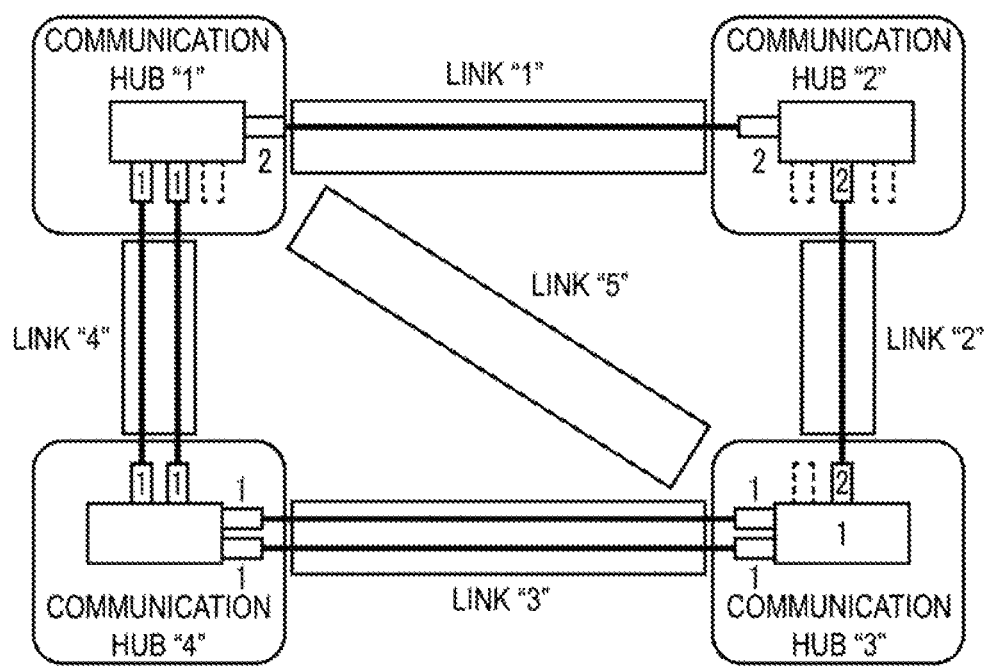
FIG. 10 is a schematic diagram illustrating an example of an optimal disposition example in a network in the operation example in the first embodiment.

An optimal network configuration, that is, an optimal disposition example in the network is generated and output on the basis of the optimal path candidate of each line and the optimal interface combination candidate of each link derived as described above. FIG. 10 illustrates an example of an optimal disposition in a network. FIG. 10 illustrates a disposition example when the optimal path candidates of each line have been calculated as in Table 11, the optimal interface combination candidates of each link have been calculated as in Table 12.

In the optimal disposition example illustrated in FIG. 10, a switch (transfer apparatus) is disposed at communication hubs "1" to "4". At each of the communication hubs "1" to "4", an interface of an interface "2" type is installed in the link portions of link "1" and link "2", and two interfaces of an interface "1" type are installed in the link portions of link "3" and link "4". An interface is not installed in the link portion of link "5".

Operations and Effects

In the embodiment, the required degree of path redundancy in each line is designated, and the path candidate set satisfying the required degree of path redundancy is configured on the basis of the required degree of path redundancy in each line, as described above. Thus, in the optimization calculation of S3, it is possible to derive the optimal network configuration for the infrastructure network with different required degrees of path redundancy. Thereby, for example, for a line with a low required degree of path redundancy, a path set including only a main path is calculated as an optimal path candidate, and for a line with a high required degree of path redundancy, a path set including a main path and a spare path is calculated as an optimal path candidate.

A scheme described in each embodiment is stored in a recording medium such as a magnetic disk (a Floppy (registered trademark) disk, a hard disk, or the like), an optical disc (a CD-ROM, a DVD, an MO, or the like), a semiconductor memory (a ROM, a RAM, a flash memory, or the like) or transferred by a communication medium for distribution, as a program (a software means) that can be executed by a calculator (a computer). The program stored in the medium also includes a setting program for causing a software means (including not only an execution program but also a table or data structure), which will be executed in a calculator, to be configured within the calculator A calculator implementing the present apparatus executes the above-described process by loading the program recorded on the recording medium or constructing a software means using the setting program in some cases, and controlling an operation using the software means. The recording medium referred to herein is not limited to a recording medium for distribution, and includes a storage medium such as a magnetic disk or a semiconductor memory provided inside the calculator or in a device connected via a network.

Further, the present invention is not limited to the embodiments, and it is possible to make various modifications without departing from the gist of the present invention. Further, the embodiments may be implemented in appropriate combination, and in this case, effects of the combination can be obtained. Further, various inventions are included in the above embodiment and can be extracted by a combination selected from a plurality of configuration requirements that are disclosed. For example, in a case in which the problem can be solved and the effects can be obtained even when some of all the configuration requirements shown in the embodiment are removed, a configuration in which such configuration requirements have been removed can be extracted as an invention.

REFERENCE SIGNS LIST

10 Network design apparatus
11 Input unit

12 First processing unit
12a Calculation unit
13 Second processing unit
13a Calculation unit
14 Third processing unit
14a Calculation unit
15 Output unit

The invention claimed is:

1. A network design apparatus for designing a network configuration for a network in which a switch is disposed at each of a plurality of communication hubs and the communication hubs are connected by lines via slots of the switches, the network design apparatus comprising:
   a processor; and
   a storage medium having computer program instructions stored thereon, when executed by the processor, perform to:
   receive an input of topology information on a connection state between the communication hubs, line information regarding a plurality of lines accommodated in the network, apparatus information regarding the switch disposed at the communication hub and the slots in the switch, and design parameter information regarding parameters used in the design, where the line information includes a tolerance of an inter-end delay for each line and a required degree of path redundancy for each line;
   calculate a threshold value of an inter-end delay for each lines in the plurality of lines on the basis of the topology information, the line information, and the design parameter information; acquires a required degree of path redundancy for each of the lines; calculate a number of redundant paths for each of the lines in the plurality of lines on the basis of the topology information, the line information, the required degree of path redundancy of each of the lines and the design parameter information; and
   calculate a first candidate set for each of the lines on the basis of the threshold value of the inter-end delay and the number of redundant paths, path candidates in the first candidate set including paths each with an inter-end delay equal to or smaller than the threshold value and as many as the number of redundant paths;
   calculate second candidate sets for the slots on the basis of the apparatus information and the design parameter information;
   calculate, minimizing a total cost value in the overall network, an optimal path candidate of each of the lines and an optimal set of slots for each of the lines on the basis of the threshold value of an inter-end delay for each of the lines, the number of redundant paths for each of the lines and the path candidate set for each of the lines; and
   generate optimal network configuration information reflecting both the optimal path candidate of each of the lines and the optimal set of slots for each of the lines,
   wherein the first candidate set is calculated on condition that the first candidate set includes the paths as many as the number of the redundant paths for each of the path candidates, that the inter-end delay of the path included in the path candidate is equal to or smaller than the threshold value of the inter-end delay, and that the path candidates are different from each other.

2. A non-transitory computer readable medium including a network design processing program for designing a network configuration for a network in which a switch is disposed at each of a plurality of communication hubs and the communication hubs are connected by lines via slots of the switches, the network design processing program causing a processor to
   acquire topology information on a connection state between the communication hubs, line information regarding a plurality of lines accommodated in the network, apparatus information regarding the switch disposed at the communication hub and the slots in the switch, and design parameter information regarding parameters used in the design, where the line information includes a tolerance of an inter-end delay for each line and a required degree of path redundancy for each line;
   calculate a threshold value of an inter-end delay for each lines in the plurality of lines on the basis of the topology information, the line information, and the design parameter information; acquires a required degree of path redundancy for each of the lines; and calculate a number of redundant paths for each of the lines in the plurality of lines on the basis of the topology information, the line information, the required degree of path redundancy of each of the lines and the design parameter information,
   calculating a first candidate set for each of the lines on the basis of the threshold value of the inter-end delay and the number of redundant paths, and configuring the first candidate set using path candidates including paths each with an inter-end delay equal to or smaller than the threshold value and as many as the number of redundant paths;
   calculate second candidate sets for slots on the basis of the apparatus information and the design parameter information;
   calculate, minimizing a total cost value in the overall network, an optimal path candidate of each of the lines and an optimal set of slots for each of the lines on the basis of a calculation result for the first candidate set for each of the lines and a calculation result for the second candidate set for slots; and
   generate network configuration information reflecting both the calculated optimal path candidate of each of the lines and the optimal set of slots for each of the lines,
   wherein the first candidate set is calculated on condition that the first candidate set includes the paths as many as the number of the redundant paths for each of the path candidates, that the inter-end delay of the path included in the path candidate is equal to or smaller than the threshold value of the inter-end delay, and that the path candidates are different from each other.

3. A network design method for designing a network configuration for a network in which a switch is disposed at each of a plurality of communication hubs and the communication hubs are connected by lines via slots of the switches, the network design method comprising:
   acquiring topology information on a connection state between the communication hubs, line information regarding a plurality of lines accommodated in the network, apparatus information regarding the switch disposed at the communication hub and the slots in the switch, and design parameter information regarding parameters used in the design, where the line information includes a tolerance of an inter-end delay for each line and a required degree of path redundancy for each line;
   calculating a threshold value of an inter-end delay for each line& in the plurality of lines on the basis of the topology information, the line information, and the design parameter information; acquires a required degree of path redundancy for each of the lines; and calculate a number of redundant paths for each of the lines in the plurality of lines on the basis of the topology information, the line information, the required degree of path redundancy of each of the lines and the design parameter information, calculating a first candidate set for each of the lines on the basis of the threshold value of the inter-end delay and the number of redundant paths, and configuring the first candidate set using path candidates including paths each with an inter-end delay equal to or smaller than the threshold value and as many as the number of redundant paths;

calculating second candidate sets for the slots on the basis of the apparatus information and the design parameter information;

calculating, minimizing a total cost value in the overall network, an optimal path candidate of each pf the lines and an optimal set of slots for each of the lines on the basis of a calculation result for the first candidate set for each of the lines and a calculation result for the second candidate sets of slots; and generating network configuration information reflecting both the calculated optimal path candidate of each of the lines and the calculated optimal set of slots for each of the lines, wherein the first candidate set is calculated on condition that the first candidate set includes the paths as many as the number of the redundant paths for each of the path candidates, that the inter-end delay of the path included in the path candidate is equal to or smaller than the threshold value of the inter-end delay, and that the path candidates are different from each other.

* * * * *